US008038560B2

(12) United States Patent
Lou et al.

(10) Patent No.: US 8,038,560 B2
(45) Date of Patent: Oct. 18, 2011

(54) POWER TRANSMISSION CHAIN AND POWER TRANSMISSION DEVICE

(75) Inventors: Liming Lou, Yamatokoriyama (JP); Shigeo Kamamoto, Kashiwara (JP)

(73) Assignee: JTEKT Corporation, Osaka-shi (JP)

( * ) Notice: Subject to any disclaimer, the term of this patent is extended or adjusted under 35 U.S.C. 154(b) by 700 days.

(21) Appl. No.: 10/577,329

(22) PCT Filed: Oct. 29, 2004

(86) PCT No.: PCT/JP2004/016456
§ 371 (c)(1),
(2), (4) Date: Dec. 18, 2006

(87) PCT Pub. No.: WO2005/045280
PCT Pub. Date: May 19, 2005

(65) Prior Publication Data
US 2007/0082517 A1    Apr. 12, 2007

(30) Foreign Application Priority Data

Oct. 29, 2003 (JP) ................... 2003-368543
Oct. 29, 2003 (JP) ................... 2003-368547
Jun. 15, 2004 (JP) ................... 2004-176377

(51) Int. Cl.
*F16G 13/04* (2006.01)
*F16G 13/02* (2006.01)
*F16G 1/21* (2006.01)
*F16G 1/22* (2006.01)
*F16G 5/16* (2006.01)

(52) U.S. Cl. ......... 474/229; 474/230; 474/242; 474/212

(58) Field of Classification Search .................. 474/215, 474/212–214, 229, 230, 242
See application file for complete search history.

(56) References Cited

U.S. PATENT DOCUMENTS

| 1,651,832 | A | * | 12/1927 | Morse | 474/216 |
|-----------|---|---|---------|-------|---------|
| 3,092,957 | A | * | 6/1963 | Larkin, Jr. | 59/8 |
| 4,342,560 | A | * | 8/1982 | Ledvina et al. | 474/157 |
| 4,516,963 | A | * | 5/1985 | Mott | 474/245 |
| 4,618,338 | A | * | 10/1986 | Rattunde et al. | 474/245 |
| 4,650,445 | A | * | 3/1987 | Mott | 474/201 |
| 4,708,701 | A | * | 11/1987 | Cole, Jr. | 474/245 |

(Continued)

FOREIGN PATENT DOCUMENTS

DE       10201979       10/2002

(Continued)

*Primary Examiner* — Michael Mansen
*Assistant Examiner* — Henry Liu
(74) *Attorney, Agent, or Firm* — Oblon, Spivak, McClelland, Maier & Neustadt, L.L.P.

(57) ABSTRACT

A power transmission chain (1) has links (11), pins (14), and interpieces (15). The links (14) each have a front and a back insertion parts (12, 13) through which the pins are inserted. The pins (14) and the interpieces (15) connect links (11) that are arranged side by side in the lateral direction of the chain such that the front insertion part (12) of one of the links (11) and the rear insertion part (13) of the other link (11) correspond to each other, and the connection is made such that that the links (11) are bendable in the longitudinal direction. The locus of a contact position of a pin (14) and an interpiece (15) is an involute of a circle. Two or more kinds of sets of a pin (14) and an interpiece (15) having different radii of base circles of involutes are formed, and these sets of a pin (14) and an interpiece (15) are randomly arranged.

7 Claims, 12 Drawing Sheets

U.S. PATENT DOCUMENTS

| | | | |
|---|---|---|---|
| 4,718,880 A * | 1/1988 | Zimmer | 474/201 |
| 4,898,567 A * | 2/1990 | Tatara et al. | 474/174 |
| 4,976,662 A * | 12/1990 | Miranti, Jr. | 474/205 |
| 5,131,892 A * | 7/1992 | Mott | 474/240 |
| 5,211,608 A * | 5/1993 | Wong et al. | 474/202 |
| 5,226,856 A * | 7/1993 | Iacchetta et al. | 474/207 |
| 5,419,743 A * | 5/1995 | Takeda et al. | 474/157 |
| 5,453,059 A * | 9/1995 | Avramidis et al. | 474/212 |
| 5,728,021 A * | 3/1998 | van Rooij et al. | 474/229 |
| 5,921,879 A * | 7/1999 | Young | 474/202 |
| 6,299,559 B1 * | 10/2001 | Friedmann | 474/242 |
| 6,432,011 B1 * | 8/2002 | Kanehira et al. | 474/215 |
| 6,478,704 B1 * | 11/2002 | Greiter | 474/229 |
| 7,416,500 B2 * | 8/2008 | Young et al. | 474/202 |
| 2002/0119853 A1 * | 8/2002 | Horie | 474/213 |
| 2003/0087714 A1 * | 5/2003 | Todd | 474/156 |
| 2004/0185977 A1 * | 9/2004 | Young et al. | 474/202 |
| 2007/0042849 A1 * | 2/2007 | Tada et al. | 474/206 |

FOREIGN PATENT DOCUMENTS

| | | |
|---|---|---|
| EP | 0741255 | 11/1996 |
| EP | 1688640 | 8/2006 |
| JP | 5 22666 | 6/1993 |
| JP | 08 312725 | 11/1996 |
| JP | 2624548 | 6/1997 |

* cited by examiner

| LINK | 1st | 2nd | 3rd | 4th | ...... | Nth |
|---|---|---|---|---|---|---|
| PITCH | P1 | P1 | P1 | P1 | P1 | P1 |
| BASIC CIRCLE RADIUS | R1 | R2 | R2 | R1 | Rm | R1 | m = 1 or 2

(b)

| LINK | 1st | 2nd | 3rd | 4th | ...... | Nth |
|---|---|---|---|---|---|---|
| PITCH | P1 | P1 | P1 | P1 | P1 | P1 |
| BASIC CIRCLE RADIUS | R1 | R2 | R1 | R3 | Rm | R2 | m = 1, 2 or 3

(c)

| LINK | 1st | 2nd | 3rd | 4th | ...... | Nth |
|---|---|---|---|---|---|---|
| PITCH | P1 | P1 | P1 | P1 | P1 | P1 |
| BASIC CIRCLE RADIUS | R1 | R1 | R1 | R1 | R1 | R1 |

| LINK | 1st | 2nd | 3rd | 4th | ...... | Nth |
|---|---|---|---|---|---|---|
| PITCH | P1 | P2 | P2 | P1 | Pm | P1 |
| BASIC CIRCLE RADIUS | R1 | R2 | R2 | R1 | Rm | R1 | m = 1 or 2

P1 < P2, R1 < R2

(b)

| LINK | 1st | 2nd | 3rd | 4th | ...... | Nth |
|---|---|---|---|---|---|---|
| PITCH | P1 | P2 | P1 | P3 | Pm | P2 |
| BASIC CIRCLE RADIUS | R1 | R2 | R1 | R3 | Rm | R2 | m = 1, 2 or 3

P1 < P2 < P3, R1 < R2 < R3

(c)

| LINK | 1st | 2nd | 3rd | 4th | ...... | Nth |
|---|---|---|---|---|---|---|
| PITCH | P1 | P1 | P1 | P1 | P1 | P1 |
| BASIC CIRCLE RADIUS | R1 | R1 | R1 | R1 | R1 | R1 |

(a)

(b)

(a)

(b)

POWER TRANSMISSION CHAIN AND POWER TRANSMISSION DEVICE

TECHNICAL FIELD

The present invention relates to a power transmission chain, and in more detail, to a power transmission chain preferable for a continuously variable transmission (CVT) of an automobile.

BACKGROUND ART

As a continuously variable transmission for an automobile, there has been known one which includes: a drive pulley (2), having a fixed sheave (2a) and a movable sheave (2b), provided on the engine side; a driven pulley (3), having a fixed sheave (3b) and a movable sheave (3a), provided on the drive wheel side: and an endless power transmission chain (1) provided over the both, and in which the movable sheaves (2b) (3a) are caused to come close to or leave away from the fixed sheaves (2a) (3b) by a hydraulic actuator, whereby a chain (1) is cramped by a hydraulic pressure so as to cause a contact load between the pulleys (2) (3) and the chain (1), and torque is transmitted by a frictional force of the contact part, as shown in FIG. 18.

As the power transmission chain, Patent Document 1 (Publication of Japanese Patent Application Laid-open No. H08-312725) proposes one which includes: a plurality of links having front and back insertion parts through which pins are inserted; and a plurality of first pins and a plurality of second pins for connecting the links aligned in a chain width direction so as to be bendable in a longitudinal direction such that a front insertion part of one link and a back insertion part of another link correspond to each other, in which a first pin fixed to a front insertion part of one link and movably fitted in a back insertion part of another link and a second pin movably fitted in the front insertion part of the one link and fixed to the back insertion part of the other link move relatively in a rolling and contacting manner so as to enable bending in a longitudinal direction between the links.

The power transmission chain of Patent Document 1 suppresses polygonal vibration caused due to the fact that the chain is not a continuum and reduces noises of a continuously variable transmission using it. However, in order to enhance quietness and to improve comfort of an automobile in which the chain is mounted, for example, it is preferable to further reduce noises.

An object of the present invention is to provide a power transmission chain and a power transmission device capable of suppressing polygonal vibration to thereby remove causes of noises.

DISCLOSURE OF THE INVENTION

A power transmission chain according to the present invention includes; a plurality of links having front and back insertion parts through which pins are inserted; and a plurality of first pins and a plurality of second pins for connecting the links aligned in a chain width direction so as to be bendable in a longitudinal direction such that a front insertion part of one link and a back insertion part of another link correspond to each other, in which a first pin fixed to a front insertion part of one link and movably fitted in a back insertion part of another link and a second pin movably fitted in the front insertion part of the one link and fixed to the back insertion part of the other link move relatively in a rolling and contacting manner so as to enable bending in a longitudinal direction between the links, wherein at least two kinds of sets of pins are provided in which loci of rolling contact movement of the first pin and the second pin are different, and the sets of pins are aligned randomly.

The first pin and the second pin are so formed that a contact surface of one pin is flat, and a contact surface of the other pin is a curved surface required for enabling rolling contact movement relatively, for example. In this case, since at least two kinds of required curved surfaces (e.g., one having large curvature relatively and one having small curvature relatively) are formed, sets of pins are obtained in which loci of rolling contact movements are different. The first pin and the second pin may be formed such that the respective contact surfaces are required curved surfaces. In such a case, since the contact surface shapes of the respective pins are formed in at least two kinds respectively (e.g., one having large curvature relatively and one having small curvature relatively), sets of pins are obtained in which loci of rolling contact movements are different.

The two kinds of sets of pins may be the same number or almost the same number, but a case where one is about twice or about five times as large as the other is also acceptable.

In order to obtain at least two kinds of sets in which loci of rolling contact movements of the first pins and the second pins are different, it is only necessary to form two or more kinds of sets of the first pins and the second pins in which the locus of a contact position of a first pin and a second pin is an involute of a circle and basic circle radii of the involutes are different.

In the power transmission chain, it is preferable that two or more kinds of links having different pitches be formed, and the links be aligned randomly.

A pitch means an interval between the front and back insertion parts. By changing the interval between the front and back insertion parts while keeping the shapes of the insertion parts to be same, links of different pitches are obtained. The size of a link itself may be changed corresponding to a pitch, or not to be changed. The two kinds of pitches (links) may be in the same number or almost the same number, but a case where one is about twice or about five times as large as the other is also acceptable. Further, the number may be determined so as to correspond to the number of sets of pins, or the number may be determined irrespective of the number of sets of pins.

Assuming that a contact position of the first pin and the second pin in a chain linear part is an origin, a chain linear direction is an x axis, a direction orthogonal thereto is a y axis, and an angle defined by a pin tangential direction with respect to the y axis at a contact position of the first pin and the second pin in a chain curved part is γ, an involute curve of a circle whose basic circle radius is Rb is obtained by the following equations.

$$x = Rb \cdot (\sin \gamma - \gamma \cdot \cos \gamma)$$

$$y = Rb \cdot (\cos \gamma + \gamma \cdot \sin \gamma) - Rb$$

When it is used as a chain for a CVT, assuming a minimum radius of the chain curved part when used as a chain for the CVT is R, and transmission ratio of the CVT is r, it is preferable that the following relationships be established:

$$Rb = k \cdot R$$

$$0.25 < k < 2r$$

That is, it is preferable that two kinds (three kinds or more if required) of involute curves be selected from arbitrary involute curves between an involute curve where k=0.25 (allowable lower limit curve) and an involute curve where k=2r (allowable upper limit curve) in the following equations.

$$x = k \cdot R \cdot (\sin \gamma \cdot \cos \gamma)$$

$$y = k \cdot R \cdot (\cos \gamma + \gamma \cdot \sin \gamma) - k \cdot R$$

As for a locus of the rolling contact movement, the locus of a contact position of the first pin and the second pin is not limited to an involute of a circle, and may be a non-involute curve (involute similar curve) between an involute curve where k=0.25 (allowable lower limit curve) and an involute curve where k=2r (allowable upper limit curve).

One of the first pin and the second pin is a pin which contacts a pulley when the chain is used in a continuously variable transmission (hereinafter referred to as "pin"), and the other one is a pin not contacting the pulley (called interpiece or strip, hereinafter referred to as "interpiece").

A front insertion part of a link consists of a pin fixing part to which a pin is fixed and an interpiece movable part in which an interpiece is movably fitted, and a back insertion part of a link consists of a pin movable part in which a pin is movably fitted and an interpiece fixed part to which an interpiece is fixed. Front and back insertion parts may be formed such that front and back through holes separated each other are formed in a link, in which the front through hole is the front insertion part and the back through hole is the back insertion part. Alternatively, a through hole elongated in front and back may be formed in a link, in which the front part of the through hole is the front insertion part and the back part of the through hole is the back insertion part.

Although, in the present specification, one end side in a longitudinal direction of a link is front and the other end side is back, these front and back are for convenience, and it does not mean the longitudinal direction of a link always coincides with a front and back direction.

In the power transmission chain of the present invention, the number of sets of pins in which loci of rolling contact movements are different may be any number, provided it is two or more. When the number of sets of pins having different loci increases, the manufacturing cost increases, and the effect is not proportional to the number, so it is sufficient that the number of sets of pins having different loci is five or less. Even though the sets of pins having different loci are two kinds, it is possible to prevent resonance due to polygonal vibration by aligning them randomly, whereby it is possible to significantly reduce noises caused by the chain.

Further, the number of links having different pitches may be any number, provided it is two or more. By making pitches in random order, it is possible to prevent energy concentration of impact force between a pin and a pulley.

When the pitch becomes larger, amplitude and an angle of approach become larger, so vibration is tend to be larger. Therefore, as for those having large pitch, it is preferable to enlarge the basic circle radius so as to reduce the angle of approach. When the number of pitches increases, the manufacturing cost increases, so it is sufficient that the number of pitches is five or less. Even if the pitches are of two kinds, by aligning sets of pins having different loci and aligning the pitches randomly, it is possible to significantly prevent resonance of polygonal vibration.

In the above description, when aligning sets of pins of different shapes and links of different pitches randomly, it is more preferable that at least one (preferably 2 or more) of the following four conditions be satisfied.

A) No alignment number of the same kind of elements appears within a range of ±5% on the basis of any point.

B) The alignment number of the largest frequency does not exceed three times as large as the alignment number of the smallest frequency existing.

C) Kinds of continuous alignment number of the same kind of elements including different types of elements exceeds three kinds.

D) A part having rotational symmetry of alignment patterns of 60 degrees or less does not exceed 50% of the whole.

In this specification, a "random alignment" means at least one of the above-described four conditions is satisfied in a narrow sense. However, a case in which an alignment of "abbabb" is provided for only one part for example, and parts other than this satisfy A) should be considered as a random alignment. A "random alignment" is considered as to include those in which respective elements are aligned without periodicity and regularity in only one part of the whole as well as those in which respective elements are aligned without periodicity and regularity throughout.

The power transmission chain is, for example, one in which the locus of a contact position of a first pin and a second pin is an involute of a circle and two kinds or more links having different pitches are formed, and a basic circle radius of an involute in a link having a large pitch is larger than a basic circle radius of an involute in a link having a small pitch.

In a power transmission chain including: a plurality of links having front and back insertion parts through which pins are inserted; and a plurality of first pins and a plurality of second pins for connecting the links aligned in a chain width direction so as to be bendable in a longitudinal direction such that a front insertion part of one link and a back insertion part of another link correspond to each other, in which a first pin fixed to the front insertion part of one link and movably fitted in the back insertion part of another link and a second pin movably fitted in the front insertion part of the one link and fixed to the back insertion part of the other link move in a rolling and contacting manner relatively so as to enable bending in a longitudinal direction between the links, there is a case where the locus of a contact position of the first pin and the second pin is an involute of a circle, and [radius of basic circle of involute]/[height of pin]=5 to 20.

By increasing the basic circle radius of the involute, the angle of approach can be smaller, so due to an effect of the angle of approach being decreased, it is possible to reduce noises and vibration of the chain. In a continuously variable transmission for an automobile, the height of a pin is about 4 to 20 mm, and a basic circle diameter is preferably about 5 to 20 times as large as it, and more preferably 9 to 17 times, and yet more preferably, 11 to 15 times. A first pin and a second pin have the almost same height, and either pin may be a base pin, but more strictly, a longer pin, that is, a pin in which end faces thereof contact conical sheave faces of a pulley of the continuously variable transmission is the base. For one in which the locus of a contact position of a first pin and a second pin is an involute of a circle, and [radius of basic circle of involute]/[height of pin]=5 to 20, it is possible to suppress polygonal vibration effectively even in a case of one set of pins, whereby causes of noises can be removed.

A configuration in which [radius of basic circle of involute]/[height of pin]=5 to 20 is capable of suppressing polygonal vibration and further removing causes of noises, by being combined with a power transmission chain having two kinds of sets of pins.

In order to have the locus of a contact position of pins moving in a rolling and contacting manner relatively to be an involute curve, it is only necessary that a contact surface of one pin is in the involute shape having the basic circle of the radius Rb in a section, and a contact surface of the other pin is flat (sectional shape is a line), for example.

The locus of a contact position of pins may be an involute curve of a circle although both contact surfaces of the pins are curved surfaces. For example, sectional shapes of a first pin and a second pin may be same, and the locus of a contact position of the first pin and the second pin may be an involute curve of a circle. In this case, assuming that an x directional relative distance between a sectional curve $g1(y)$ of a contact surface on the pin side and a sectional curve $g2(y)$ of a contact surface on the interpiece side is $Lx=f(y)$ (x: chain travel direction coordinate, y: radial direction coordinate), $g1=-g2$, and Lx is an involute curve of a circle.

It is preferable that the power transmission chain described above be one in which one pin (interpiece) is shorter than the other pin (pin), and end faces of the longer pin contact conical sheave faces of a pulley of the continuously variable transmission, and power is transmitted by a frictional force caused by this contact. Each pulley consists of a fixing sheave having a conical sheave face and a movable sheave having a conical sheave face facing the sheave face of the fixing sheave, and a chain is interposed between the sheave faces of the both sheaves, and the movable sheave is moved by a hydraulic actuator whereby a winding radius of the chain changes depending on the distance between the sheave faces of the continuously variable transmission, which enables variable transmission continuously with smooth movement.

A power transmission device according to the present invention includes a first pulley having a sheave face in a conical surface shape, a second pulley having a sheave face in a conical surface shape, and a power transmission chain is provided over the first and second pulleys, and the power transmission chain is one of those described above.

The power transmission device becomes one preferable to be used as a continuously variable transmission of an automobile.

BRIEF DESCRIPTION OF THE DRAWINGS

FIG. 9 shows tables of examples of basic circle radii of a power transmission chain and random alignments according to the present invention.

FIG. 10 shows tables shows tables examples of pitches and basic circle radii of a power transmission chain and random alignments according to the present invention.

BEST MODE FOR CARRYING OUT THE INVENTION

Hereinafter, an embodiment of the present invention will be explained with reference to the drawings. In the explanation below, the left in FIG. 3 is called front and the right thereof is called back.

Figure 1:
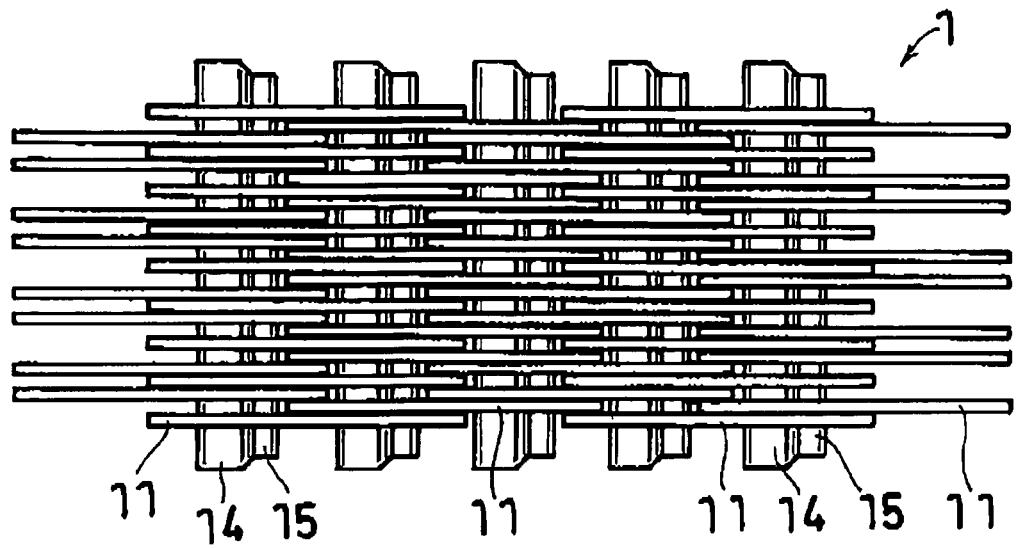
FIG. 1 is a plan view showing a part of a power transmission chain according to the present invention.
Figure 2:
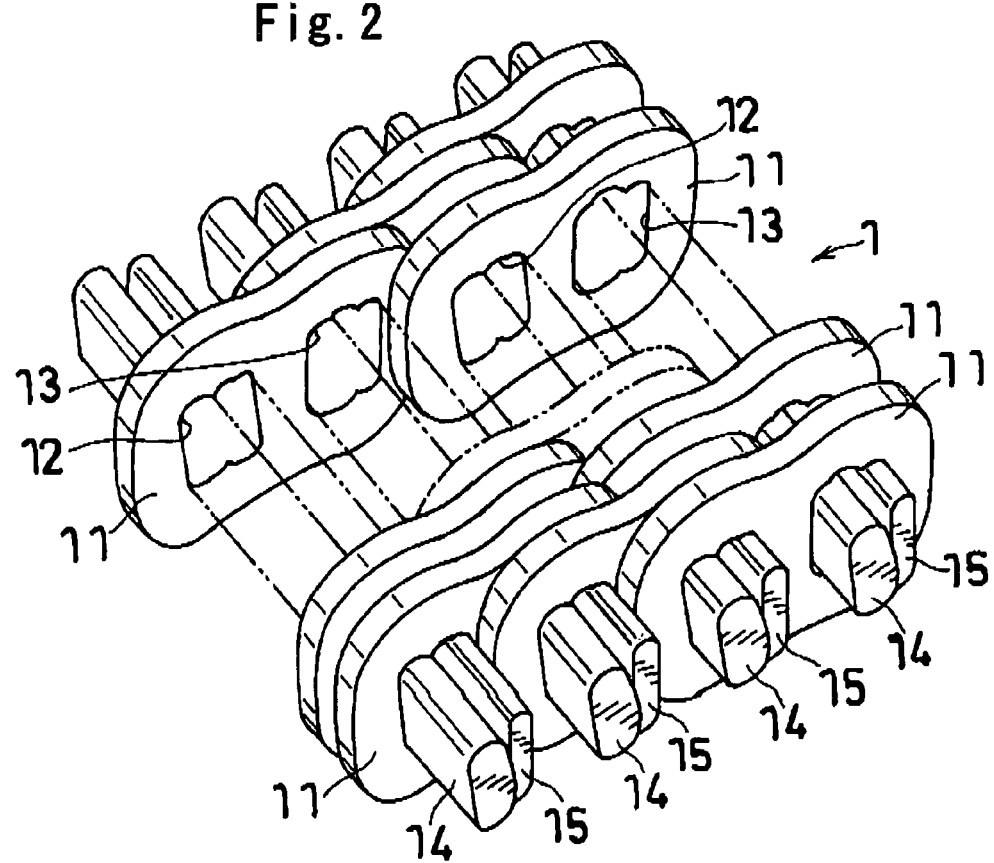
FIG. 2 is an enlarged perspective view of the same.

FIGS. 1 and 2 show a part of a power transmission chain according to the present invention. A power transmission chain (1) includes: a plurality of links (11) having front and back insertion parts (12) (13) provided at predetermined intervals in a chain length direction; and a plurality of pins (first pins) (14) and interpieces (second pins) (15) for connecting links (11) aligned in a chain width direction so as to be bendable in a longitudinal direction (chain length direction).

Figure 3:
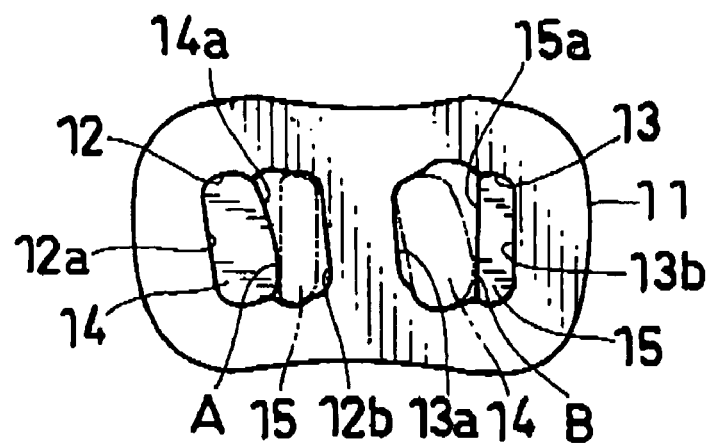
FIG. 3 is an enlarged side view of the same.

As shown in FIG. 3, the front insertion part (12) consists of a pin fixing part (12a) to which a pin (14) (shown by a continuous line) is fixed and an interpiece movable part (12b) in which an interpiece (15) (shown by an alternate long and two short dashes line) is movably fitted, and the back insertion part (13) consists of a pin movable part (13a) in which a pin (14) (shown by an alternate long and two short dashes line) is movably fitted and an interpiece fixing part (13b) to which an interpiece (15) (shown by a continuous line) is fixed. In connecting the links (11) aligned in a chain width direction, links (11) are overlapped with each other such that the front insertion part (12) of one link (11) and the back insertion part (13) of another link (11) correspond to each other, and the pin (14) is fixed to the front insertion part (12) of one link (11) and is movably fitted in the back insertion part (13) of another link (11), and the interpiece (15) is movably fitted in the front insertion part (12) of one link (11) and is fixed to the back insertion part (13) of another link (11). Then, the pin (14) and the interpiece (15) move in a rolling and contacting manner relatively so as to enable bending in a longitudinal direction (front and back direction) of the links (11).

Figure 4:
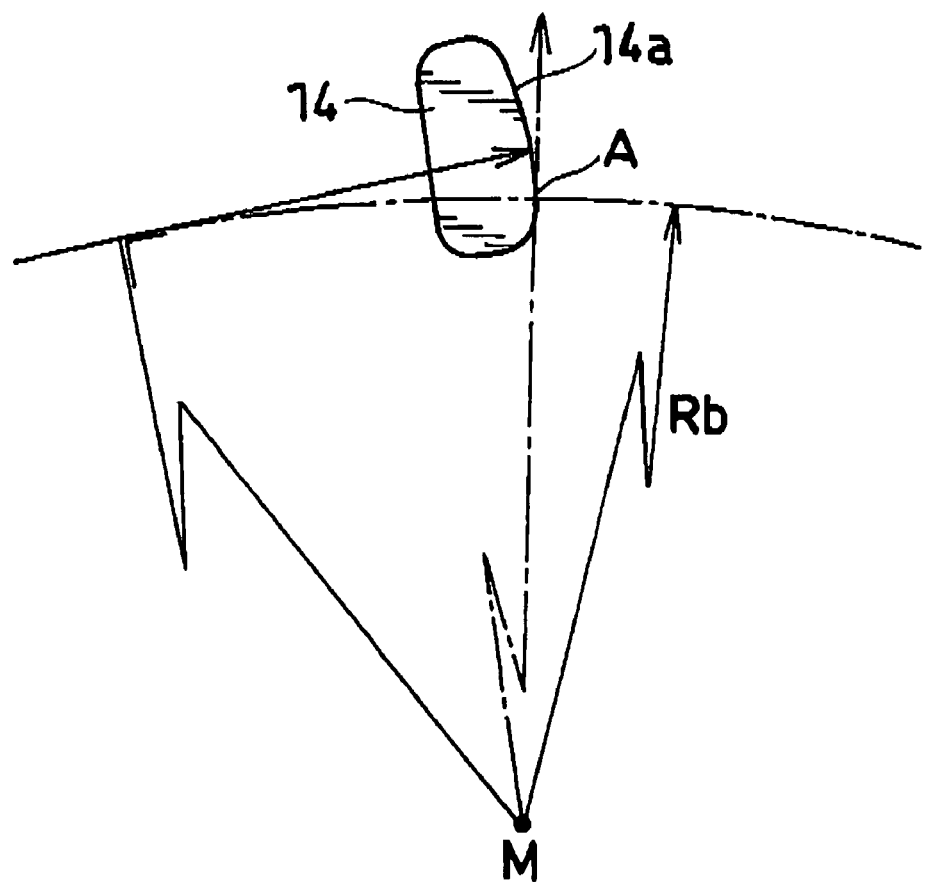
FIG. 4 is a diagram for explaining a basic circle radius of a contact surface.

The locus of a contact position of the pin (14) and the interpiece (15), based on the pin (14), is an involute of a circle. In this embodiment, a contact surface (14a) of the pin (14) is in an involute shape having a basic circle of a radius Rb and the center M in a section as shown in FIG. 4, and a contact surface (15a) of the interpiece (15) is flat (sectional shape is a line). Thereby, when each link (11) moves from the linear part to the circular part or moves from the circular part to the linear part of the chain (1), in the front insertion part (12), the interpiece (15) moves such that the contact surface (15a) thereof rolling-contacts the contact surface (14a) of the pin (14) with respect to the fixed pin (14) in the interpiece movable part (12b) (strictly, it is a rolling contact including a slight sliding contact (rolling sliding contact)), and in the back insertion part (13), the pin (14) moves, in the pin movable part (13a), such that the contact surface (14a) thereof rolling-contacts the contact surface (15a) of the interpiece (15) with respect to the fixed interpiece (15) (strictly, it is a rolling contact including a slight sliding contact (rolling sliding contact)). In FIG. 3, the parts shown by the reference marks A and B are lines (points in the section) where the pin (14) and the interpiece (15) contact each other in the linear part of the chain (1), and the distance between A and B is considered as a pitch in this specification.

Figure 5:
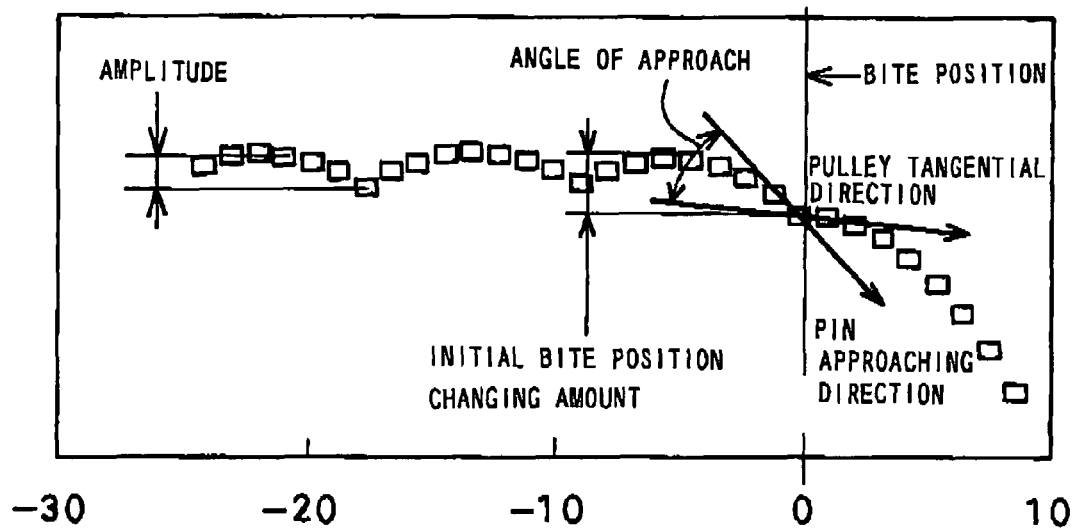
FIG. 5 is a diagram showing a moving locus of a pin.

In such a power transmission chain (1), there is caused polygonal vibration with the moving locus of the pin shown in FIG. 5. In FIG. 5, in a biting position where the pin (shown by a square mark) moves from the linear part to the circular part contacting a pulley, a tangential direction of the pulley and an approaching direction of the pin are different (an angle defined by these directions is an angle of approach), and the pin contacts the pulley while moving downward. The fall amount of the pin, when contacting the pulley, is shown as initial biting position changing amount. The pin located at the linear part also moves up and down affected by the fall of the pin located at the biting position, and the movement amount in up and down becomes amplitude. Through repetition of such up and down movement of the pin, polygonal vibration is caused.

Figure 6:
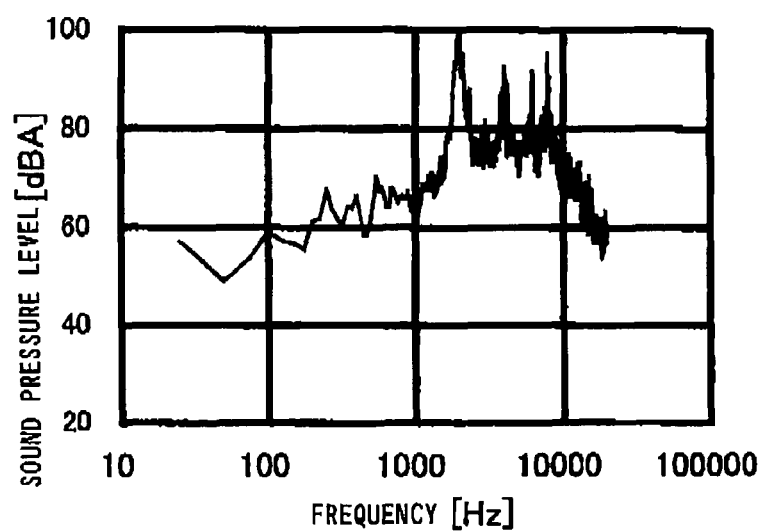
FIG. 6 is a graph showing a sound pressure level when equal pitch alignment is adopted.

Since the pin (14) and the interpiece (15) move in a rolling and contacting manner relatively and the locus of a contact position of the pin (14) and the interpiece (15) is an involute of a circle, the amplitude can be smaller comparing with the case where both contact surfaces of the pin and the interpiece are circular faces. However, even with this configuration, if there is only one kind of link (11) and the pin (14) and the interpiece (15) are used and no action is taken for reducing vibration, a peak of large sound pressure level is caused as shown in FIG. 6, which is felt as a noise for a human. Therefore, even for one in which the locus of a contact position is an involute of a circle, it is desirable to further reduce polygonal vibration.

In view of the above, in the power transmission chain according to the present invention, not all of the links (11), the pins (14) and the interpieces (15) are in the same shapes. In order to prevent resonance caused by polygonal vibration, plural kinds of sets of pins (14A) (14B) and interpieces (15A) (15B) having different radii R1 and R2 of basic circles are used as shown in FIG. 7, and preferably, links (11A) (11B) of different pitches P1 and P2 are used as shown in FIG. 8.

Figure 7:
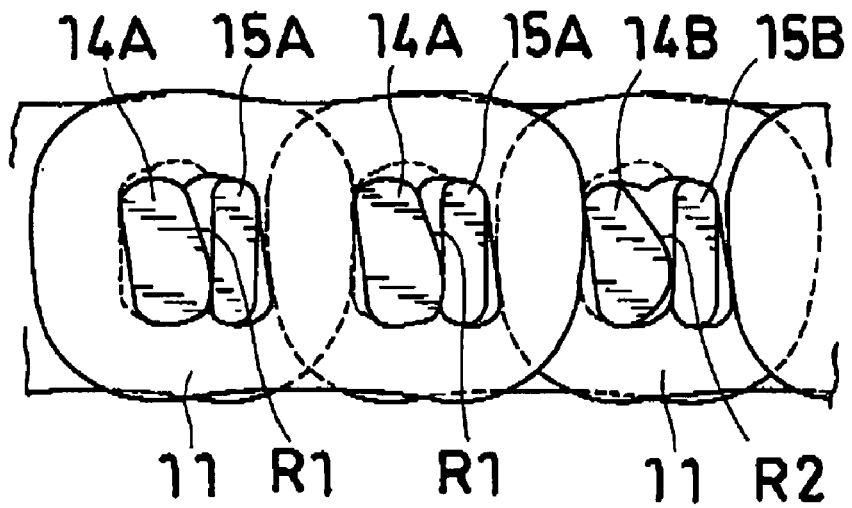
FIG. 7 is a diagram showing an example where pins of different shapes are aligned randomly.
Figure 8:
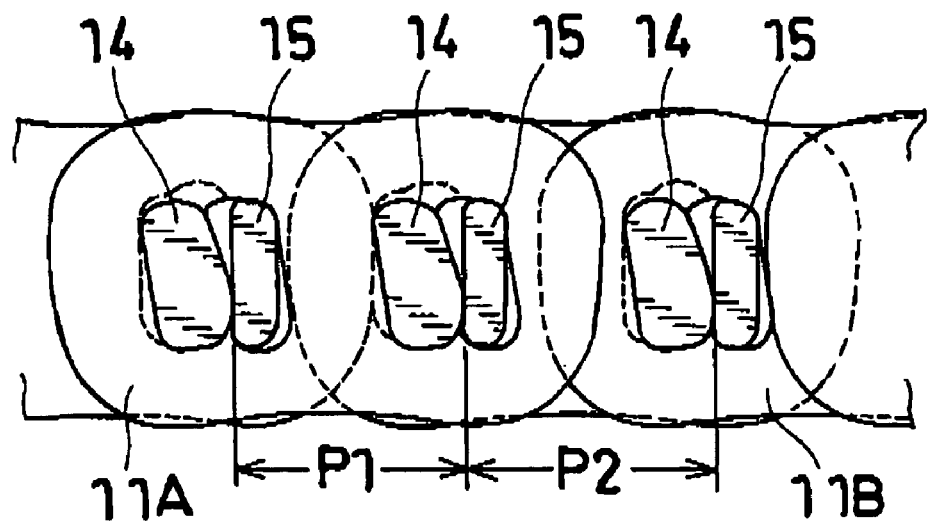
FIG. 8 is a diagram showing an example where links of different shapes are aligned randomly.

In contrast to the fact that all links, pins and interpieces conventionally have the same pitch P1 and the same radius R1 of a basic circle as shown in FIG. 9(c), in a first embodiment of the power transmission chain (1) according to this invention, as shown in FIG. 9(a), two kinds of pins (14A) (14B) shown in FIG. 7 are used and the pitch P1 is the same in all of them, and the sizes of the basic circles are different such that if the basic circle radius of the involute of the pin (14A) of a first set is R1, the basic circle radius of the involute of the pin (14B) of a second set is R2, the basic circle radius of the involute of the pin (14B) of a third set is R2, and the basic circle radius of the involute of the pin (14A) of a fourth set is R1, and are aligned in irregular order (random order).

Further, in a second embodiment of the power transmission chain (1) according to this invention, as shown in FIG. 9(b), three kinds of pins (not shown) are used and the pitch P1 is the same in all of them, and the sizes of the basic circles are different such that if the basic circle radius of the involute of the pin of a first set is R1, the basic circle radius of the involute of the pin of a second set is R2, the basic circle radius of the involute of the pin of a third set is R1, and the basic circle radius of the involute of the pin of a fourth set is R3, and are aligned in irregular order (randomly).

In order to manufacture two kinds of sets of pins (14A) (14B) and interpieces (15A) (15B) in which the basic circle radii are different, the shapes of the links (11) are same including the insertion parts (12) (13), and the contact surface (14a) of the pin (14A) is formed to be in an involute shape having a basic circle of the radius R1, and the contact surface (14a) of the pin (14B) is formed to be in an involute shape having a basic circle of the radius R2, and the interpieces (15A) (15B) are of one kind in which the contact surface (15a) is flat. As for the pins (14A) (14B) and the interpieces (15A) (15B), the sectional shapes may be reversed, or the locus of a contact position of the pin and the interpiece may be an involute of a circle and the pin and the interpiece may have the same sectional shape.

Although all links, pins and interpieces conventionally have the same pitch P1 and the same radius R1 of the basic circle as shown in FIG. 10(c), in another embodiment of the power transmission chain according to the invention, pitches are set randomly and the basic circle radius are changed corresponding thereto, as shown in FIGS. 10(a) and 10(b).

In a third embodiment of the power transmission chain (1) according to the present invention, as shown in FIG. 10(a), two kinds of links (11A) (11B) shown in FIG. 8 and two kinds of pins (14A) (14B) and interpieces (15A) (15B) shown in FIG. 7 are used, and the sizes of pitches are different such that if the pitch of a first link (11A) is P1, the pitch of a second link (11B) is P2, the pitch of a third link (11B) is P2, and the pitch of a fourth link (11A) is P1, and they are aligned in irregular order (randomly). Then, if the pitch is P1, the basic circle radius of the involute of the pin (14A) is R1, and if the pitch is P2, the basic circle radius of the involute of the pin (14B) is R2 (where R1<R2 when P1<P2).

In a fourth embodiment of the power transmission chain (1) of the present invention, as shown in FIG. 10(b), three kinds of links, pins and interpieces (not shown) are used, and the sizes of pitches are different such that if the pitch of a first link is P1, the pitch of a second link is P2, the pitch of a third link is P1, and the pitch of a fourth link is P3, and they are aligned in irregular order (randomly). Then, if the pitch is P1, the basic circle radius of the involute of the pin is R1, and if the pitch is P2, the basic circle radius of the involute of the pin is R2, and if the pitch is P3, the basic circle radius of the involute of the pin is R3 (where R1<R2<R3 when P1<P2<P3).

Figure 11:
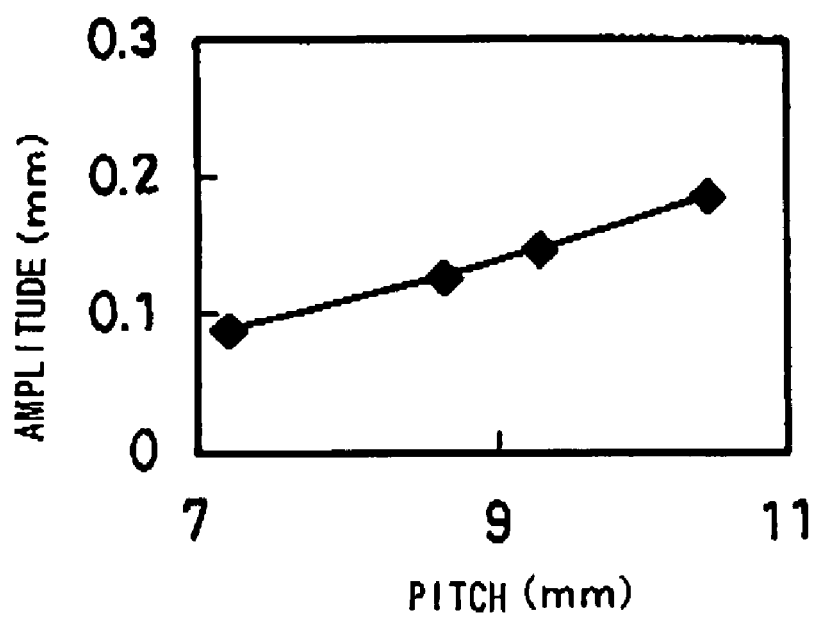
FIG. 11 shows charts of relationships between pitch and amplitude and between pitch and angle of approach.
Figure 11:
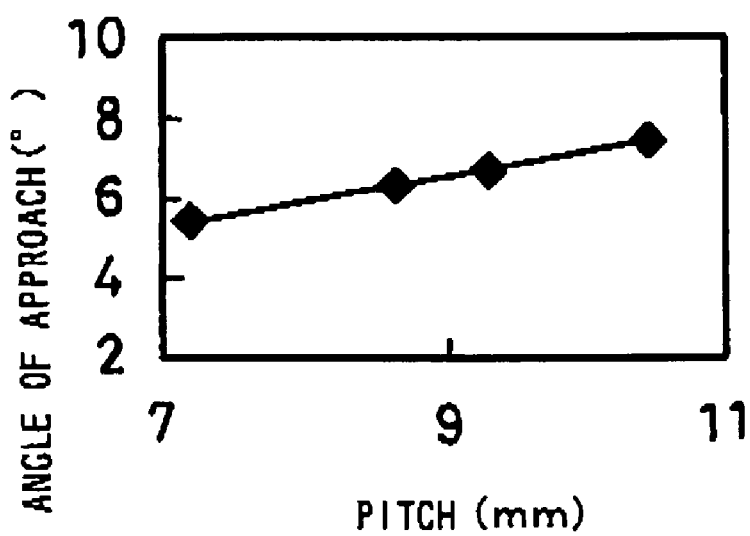

Note that the relationship between a pitch and a basic circle is not required to satisfy a condition of R1<R2 when P1<P2, and the same effect can be obtained from R1>R2 when P1<P2. However, when a pitch is increased, amplitude also becomes larger as shown in FIG. 11(a), and angle of approach also becomes larger as shown in FIG. 11(b), which causes a demerit that vibration increases since amplitude and angle of approach are large.

Figure 12:
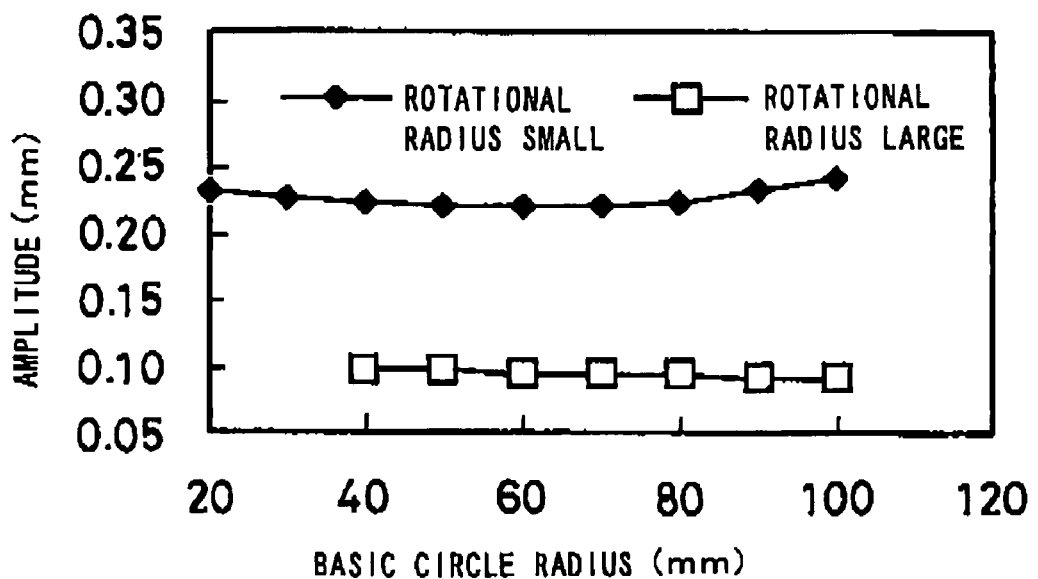
FIG. 12 shows charts of relationships between a basic circle radius and an amplitude and between a basic circle radius and an angle of approach.
Figure 12:
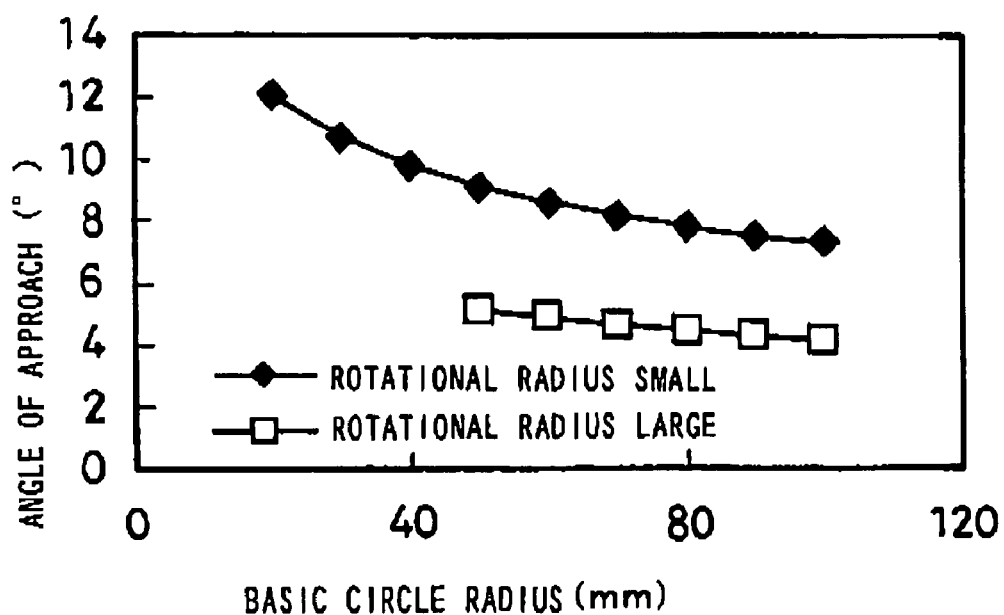

As for relationships between the basic circle radius and the amplitude, and between the basic circle radius and the angle of approach, the amplitude does not increase much although the basic circle radius increases as shown in FIG. 12(a), and an angle of approach can be smaller when the basic circle radius is increased as shown in FIG. 12(b). As a result, as the basic circle radius increases, a vibration improving effect can be achieved associating with a decrease in an angle of approach. Therefore, in the power transmission chain (1) of the third and fourth embodiments, R1<R2 when P1<P2 or R1<R2<R3 when P1<P2<P3, and for those in which the pitch is large, the basic circle radius is set to be large and an angle of approach is set to be small, whereby a demerit associating with the pitch being large is solved. Note that in FIG. 12, a large rotational radius is R=73.859, and a small rotational radius is set to R=31.65 mm. Further, the Figure shows a case where the height of a pin is 6 mm, and in such a case, it is found that Rb>51 mm is preferable, and Rb≧70 mm is more preferable.

The shape of an involute is expressed by equations $x=Rb\cdot(\sin\gamma-\gamma\cdot\cos\gamma)$ and $y=Rb\cdot(\cos\gamma+\gamma\cdot\sin\gamma)-Rb$, where Rb is the radius of the basic circle and γ is the angle. The length Le(γ) of the involute shape is $Le(\gamma)=\int(x^2+y^2)^{1/2}d\gamma$. By integrating this from γ=0 to γ, $Le(\gamma)=Rb\gamma^2/2$ is obtained. The height h of a pin is, assuming that it is proportional to the length of Le, $h=a*Le=aRb\gamma^2/2$, where "a" is a coefficient.

From this equation, it is found that h is also proportional to Rb. The height of a pin used in a continuously variable transmission of an automobile is about h=4 to 20 mm, and preferably, the range is Rb/h=5 to 20, and more preferably, Rb/h=9 to 17, and yet more preferably, Rb/h=11 to 15.

In order to producing the power transmission chain (1) of the third and fourth embodiments, the contact surface (14a) of the pin (14A) is formed to be in an involute shape having a basic circle of the radius R1, and the contact surface (14a) of the pin (14B) is formed to be in an involute shape having a basic circle with the radius R2, and two kinds of links (11A) (11B) in which distances between the front and back insertion parts (12) (13) are different are produced while the shapes of insertion parts (12) (13) are same, and the two kinds of links (11A) (11B) and two kinds of pins (14A) (14B) may be combined appropriately so as to make them continued.

Figure 13:
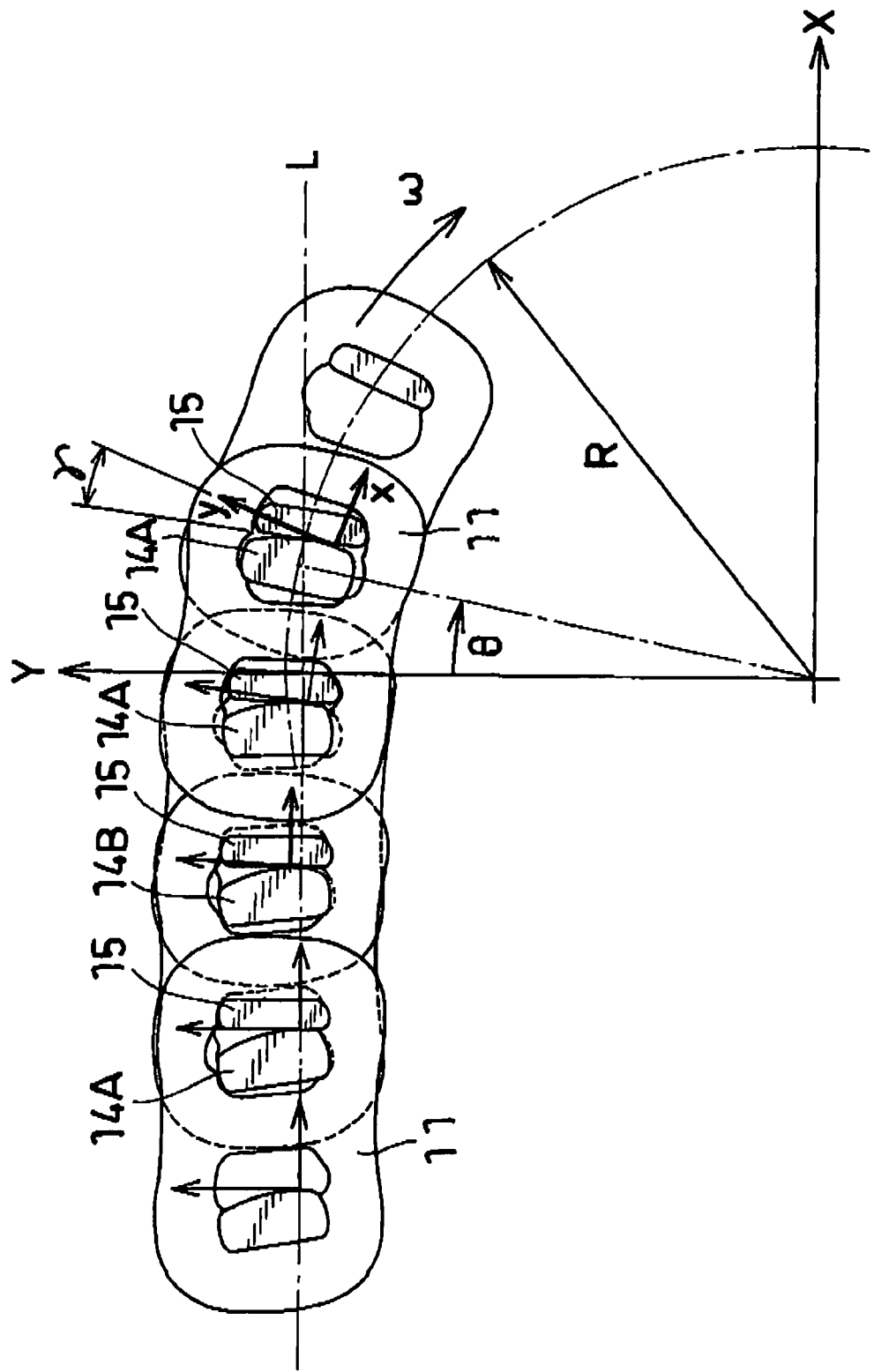
FIG. 13 is a diagram showing states of a pin before and after biting of a power transmission chain according to the present invention.

According to the power transmission chain (1) of each embodiment described above, the locus of a contact position is set to an involute curve, whereby as shown in FIG. 13, although the pins (14) (15) are bitten by the pulley (2), the chain (1) is drawn continuously in a direction of the line L shown by an alternate long and short dash line in the Figure, whereby polygonal vibration of the chain (1) due to biting position and movement after biting can be suppressed to the minimum. In the power transmission chain (1) of the first and second embodiments, the locus of the contact position of the first pins (14A) (14B) and the second pins (15A) (15B) is an involute of a circle, and two kinds of sets of first pins (14A) (14B) and second pins (15A) (15B) in which the basic circle radii of involutes are different are provided, and sets of the pins (14A) (14B) (15A) (15B) are aligned randomly. Thereby, hammering generation cycles are shifted and the sound energy is dispersed to different frequencies, so it is possible to reduce the peak of sound pressure level. In the power transmission chain (1) of the third and fourth embodiments, the locus of a contact position of the first pins (14A) (14B) and the second pins (15A) (15B) is an involute of a circle, and two kinds of sets of the first pins (14A) (14B) and the second pins (15A) (15B) having different basic circle radii of involutes are provided, and two kinds of links (11A) (11B) of different pitches are aligned randomly, whereby the peak of sound level can be further reduced. In this way, for acute peaks in FIG. 6, energy of the sound is distributed to different frequency bands so as to be largely reduced, whereby noises felt by human are reduced.

In FIG. 13, it is assumed that the center of a curve part of the chain is the origin, a direction of the linear part of the chain is an X axis, a direction orthogonal thereto is a Y axis, and an angle defined by a line linking the origin and the center of pin rolling of the chain curve part with respect to the y axis is θ. Further, assuming that the contact part of the pins (14A) (14B) and the interpieces (15) when the chain is in a linear state is the origin, a chain linear direction is an x axis, a direction orthogonal thereto is a y axis, and an angle defined by a pin connecting direction at the contact position of the pins (14A) (14B) and the interpiece (15) in the chain curve part with respect to the y axis is γ, an involute curve of a circle is given by the following equations, where the basic circle radius is Rb;

$$x=RB\cdot(\sin\gamma-\gamma\cdot\cos\gamma)$$

$$y=Rb\cdot(\cos\gamma+\gamma\cdot\sin\gamma)-Rb$$

The basic circle radius Rb is the smallest radius when used as a chain for a CVT, for example.

There are an infinite number of involute curves corresponding to basic circle radii, and since the same effect is maintained although the basic circle radius varies, an allowable range of an involute curve is shown by the following equations where R is the smallest radius of a chain for a CVT:

$$x=k\cdot R\cdot(\sin\gamma-\gamma\cdot\cos\gamma)$$

$$y=k\cdot R\cdot(\cos\gamma+\gamma\cdot\sin\gamma)-k\cdot R$$

Here, it is preferable that k be set in the following range, where the smallest radius of the chain curve part when used as a chain for a CVT is R, and transmission ratio of CVT is r.

$$0.25<k<2r$$

Figure 14:
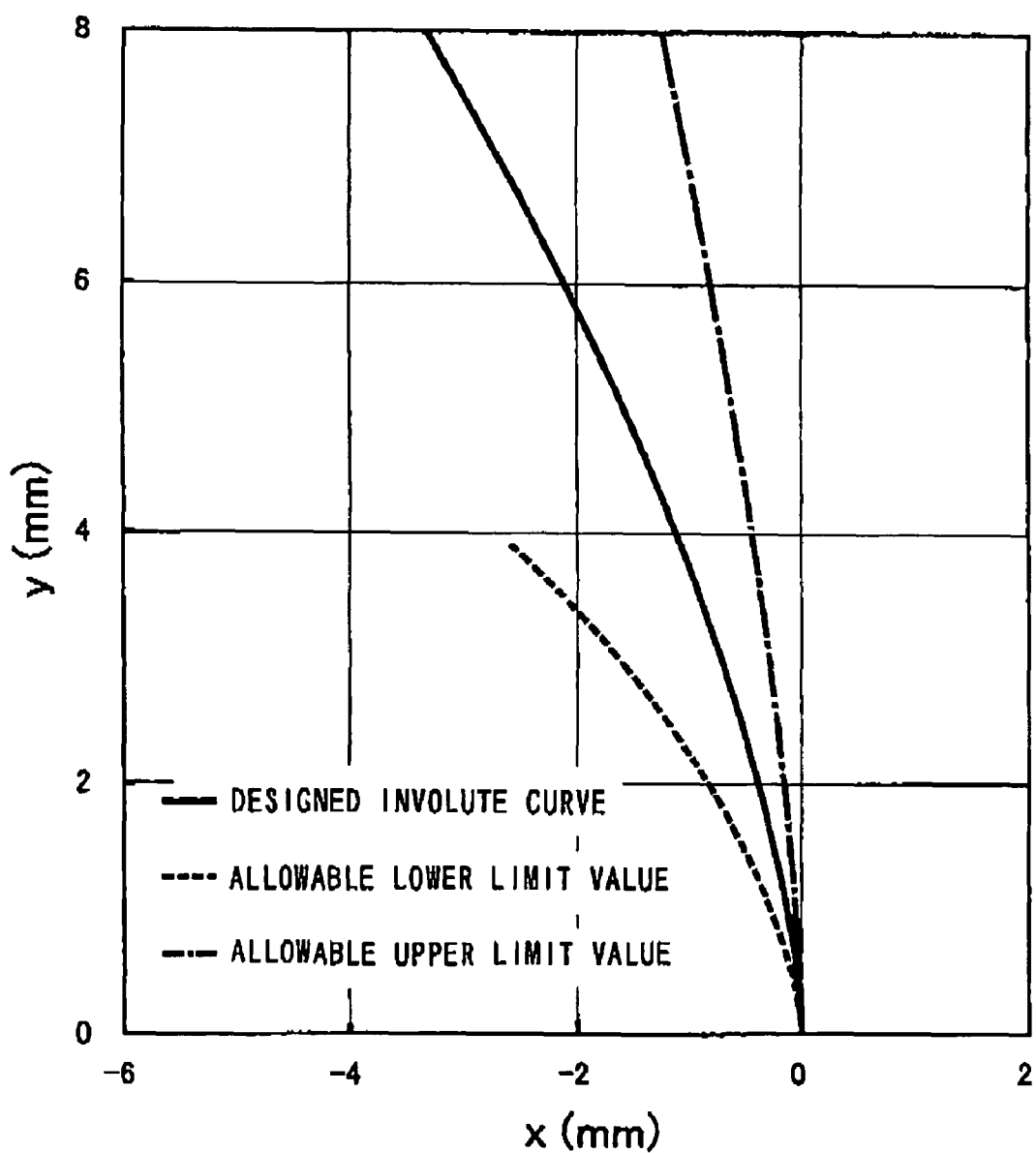
FIG. 14 is a chart showing a range of preferable contact surface shape of a pin of the power transmission chain according to the present invention.

That is, as shown in FIG. 14, it is possible to reduce noises by selecting two kinds (three kinds or more if required) of involute curves among arbitrary involute curves between an involute curve where k=0.25 (allowable lower limit curve) and an involute curve where k=2r (allowable upper limit curve).

For the locus of rolling contact movement, the locus of a contact position of the first pin and the second pin is not limited to an involute of a circle, and it may be a non-involute curve (involute similar curve) between an involute curve where k=0.25 (allowable lower limit curve) and an involute curve where k=2r (allowable upper limit curve).

Figure 17:
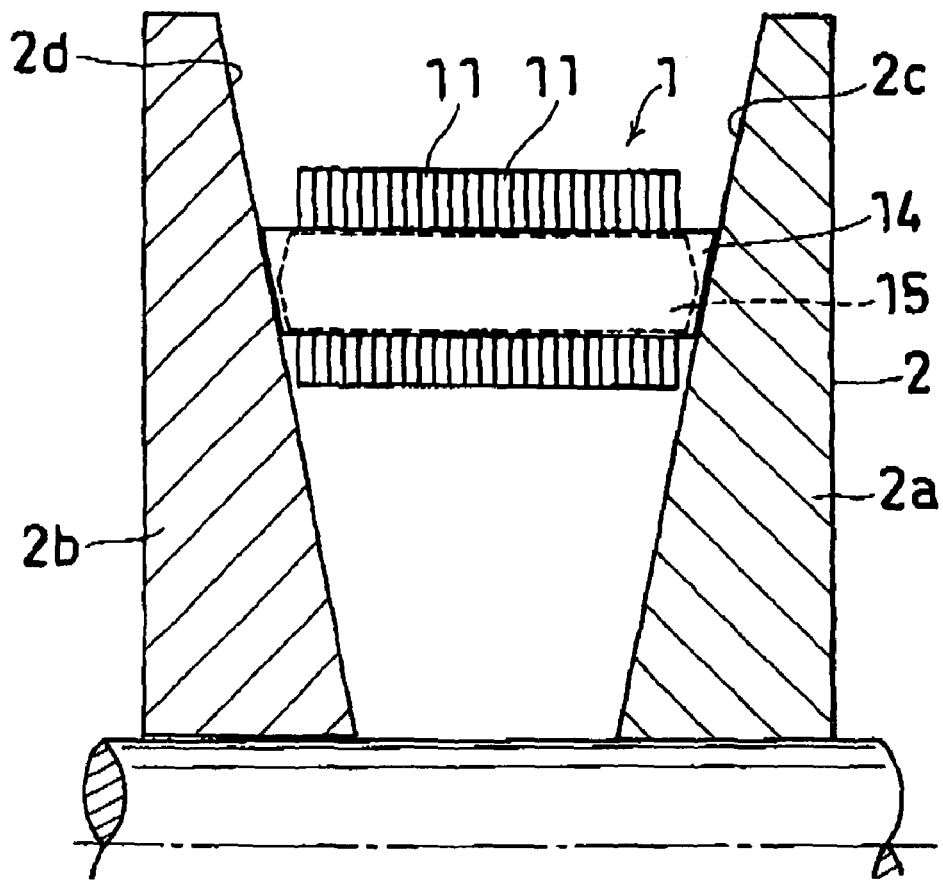
FIG. 17 is a front view showing a state where a power transmission chain is mounted on a pulley.
Figure 18:
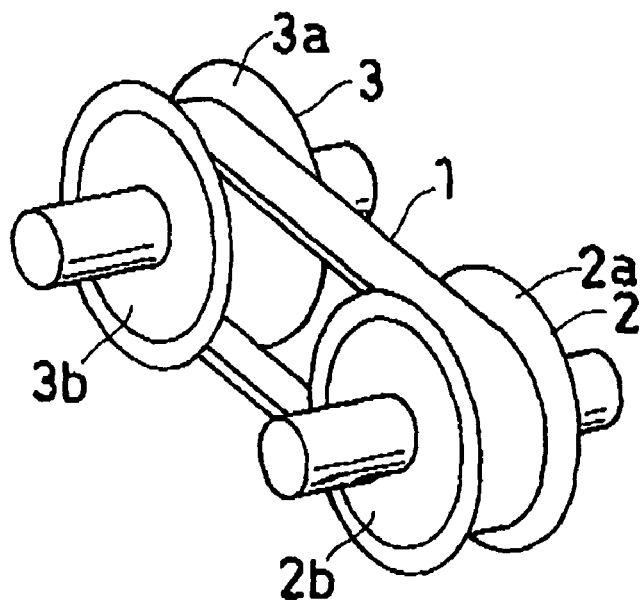
FIG. 18 is a perspective view showing an example of a continuously variable transmission in which a power transmission chain according to the present invention is used.

The power transmission chain described above is used in the CVT shown in FIG. 18, and in such a case, the interpiece (15) is set to be shorter than the pin (14), and end faces of the pin (14) contact the conical sheave faces (2c) (2d) of the pulley (2) in a state where end faces of the interpiece (15) do not contact respective conical sheave faces (2c) (2d) of the fixed sheave (2a) and the movable sheave (2b) of the pulley (2), and power is transmitted by a frictional force caused by this contact, as shown in FIG. 17. Since the pin (14) and the interpiece (15) move in a rolling and contacting manner as described above, the pin (14) will seldom rotate with respect to the sheave faces (2c) (2d) of the pulley (2), whereby frictional loss is reduced and high power transmission rate is secured.

Although the respective embodiments of the power transmission chain (1) has been explained on the premise of using the links (11), the front and back insertion parts (12) (13), the pins (14) and the interpieces (15) shown in FIG. 3, shapes of the links (11), the front and back insertion parts (12) (13), the pins (14) and the interpieces (15) are not limited to those shown in FIG. 3, and are capable of being modified variously within a range where the both are capable of moving in a rolling and contacting manner relatively. Embodiments thereof will be shown in FIGS. 15 and 16.

Figure 15:
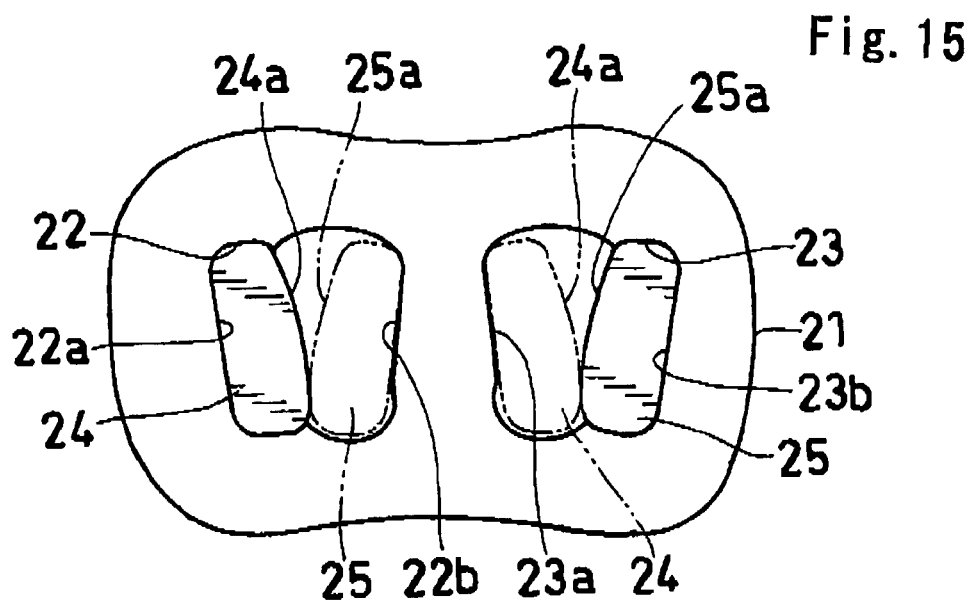
FIG. 15 is a diagram, corresponding to FIG. 3, showing another embodiment of power transmission chain according to the present invention.
Figure 16:
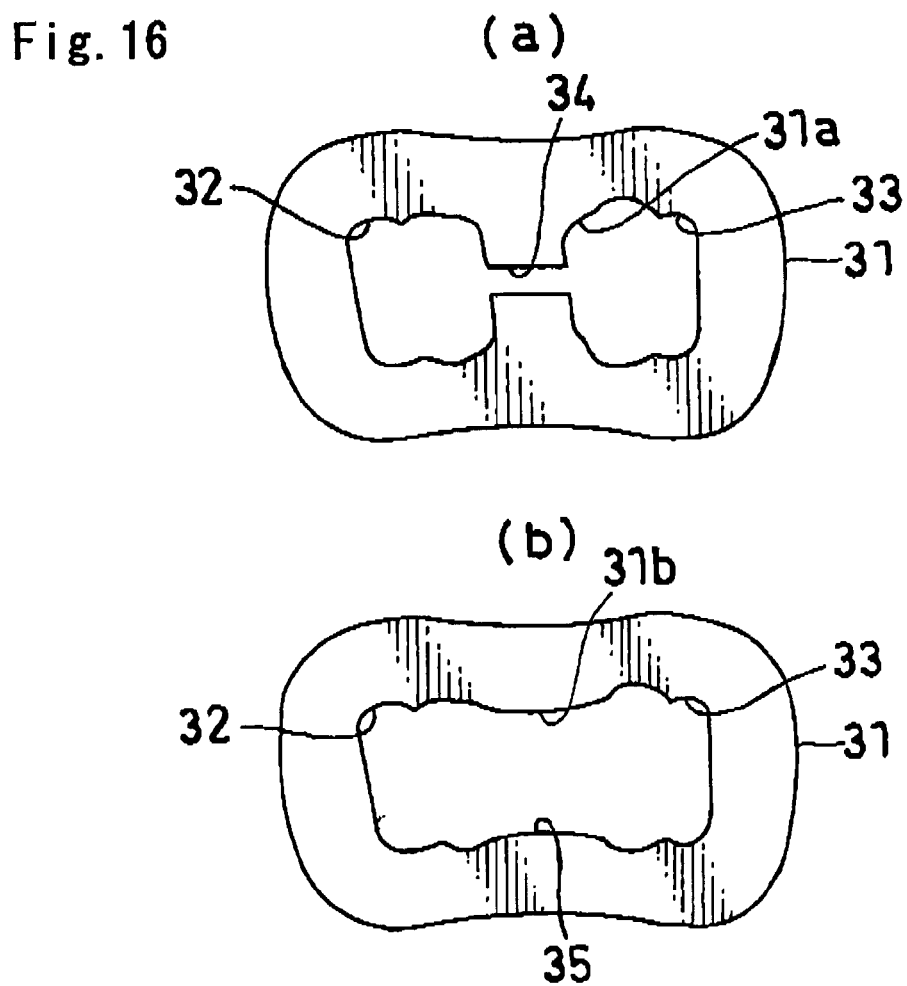
FIG. 16 shows diagrams illustrating another embodiment in a ring shape of a power transmission chain according to the present invention.

In the embodiment shown in FIG. 15, the power transmission chain (1) includes: a plurality of links (21) having front and back insertion parts (22) (23) provided at predetermined intervals in the longitudinal direction; a plurality of pins (first pins) (24) and interpieces (second pins) (25) for connecting the links (21) aligned in the chain width direction so as to be bendable in the longitudinal direction, and the links (21), the pins (24) and the interpieces (25) are assembled as shown in FIGS. 1 and 2. The front and back insertion parts (22) (23) are provided symmetrically, and the pin (24) and the interpiece (25) have the same sectional shape and are drawing-processed by using the same die.

The front insertion part (22) consists of a pin fixing part (22a) to which the pin (24) (shown by a continuous line) is fixed and an interpiece movable part (22b) in which the interpiece (25) (shown by an alternate long and two short dashes line) is movably fitted. The back insertion part (23) consists of a pin movable part (23a) in which the pin (24) (shown by an alternate long and two short dashes line) is movably fitted and the interpiece fixing part (23b) to which the interpiece (25) (shown by a continuous line) is fixed. Since the pin (24) and the interpiece (25) have the same sectional shape, the pin fixing part (22a) of the front insertion part (22) and the interpiece fixing part (23b) of the back insertion part (23) are in the same shape (symmetrical shape), and the pin movable part (22a) of the front insertion part (22) and the interpiece fixing part (23b) of the back insertion part (23) are in the same shape (symmetrical shape). In connecting the links (21) aligned in the chain width direction, the links (21) are overlapped such that the front insertion part (22) of one link (21) and the back insertion part (23) of another link (21) correspond to each other, and the pin (24) is fixed to the front insertion part (22) of the one link (21) and is also movably fitted in the back insertion part (23) of the other link (21), and the interpiece (25) is movably fitted in the front insertion part (22) of the one link (21) and is fixed to the back insertion part (23) of the other link (21). Then, the pin (24) and the interpiece (25) move in a rolling and contacting manner relatively, which enables bending in the longitudinal direction (front and back direction) of the links (21).

The surface (24a) facing the interpiece (25) of the pin (24) and the surface (25a) facing the pin (24) of the interpiece (25) are curved surfaces, and have the same sectional shape in which the locus of a contact position of the pin (24) and the interpiece (25) based on the pin (24) becomes an involute curve of a circle. That is, assuming that the sectional curve of the contact surface (24a) of the pin (24) is g1(y) and the sectional curve of the contact surface (25a) of the interpiece (25) is g2(y), g1=−g2, and if an x directional relative distance between the sectional curve of the contact surface (24a) of the pin (24) and the sectional curve of the contact surface (25a) of the interpiece (25) is Lx=f(y), Lx is an involute curve. As a result, the pin (24) and the interpiece (25) can move relatively while rolling and contacting, and polygonal vibration can be reduced significantly compared with a typical silent chain.

Further, in each of the embodiments described above, the front insertion parts (12) (22) and the back insertion parts (13) (23) are independent through holes respectively, but through holes for obtaining the insertion parts (12) (22) (13) (23) may have shapes shown in FIGS. 16(a) and 16(b) in order to ease stress concentration on the hole edges. In FIG. 16(a), a link (31) has a through hole (31a) elongated in front and back, and the front part of the through hole (31a) is the front insertion part (32) and the back part of the through hole (31a) is the back insertion part (33). The through hole (31a) is in a shape in which the front and back insertion parts (12) (13) as shown in FIG. 3 are communicated via a communication part (34), and the shapes of the front and back insertion parts (32) (33) shown in FIG. 16(a) are same as those of the front and back insertion parts (12) (13) shown in FIG. 3. Therefore, by combining them with the pins (14) and the interpieces (15) shown in FIG. 3, there is obtained a power transmission chain same as each embodiment of the power transmission chain (1) mentioned above. The height of the communication part (34) may be the height of about a several fraction of the height of the insertion parts (32) (33) for example, and as shown in FIG. 16(b), a height may be close to the height of the insertion parts (32) (33) within a range not adversely affecting the movement of the pin. In FIG. 16(b), the link (31) has a through hole (31b) elongated in front and back, and the front part of the through hole (31b) is the front insertion hole (32), and the back part of the through hole (31b) is the back insertion part (33). The through hole (31b) is in a shape in which the front and back insertion parts (12) (13) shown in FIG. 3 are communicated via a communication part (35), and the shapes of the front and back insertion parts (32) (33) shown in FIG. 16(b) are same as the shape of the front and back insertion parts (12) (13) shown in FIG. 3. Therefore, by combining the pin (14) and the interpiece (15) shown in FIG. 3, a power transmission chain same as the power transmission chain (1) of each embodiment is obtained.

INDUSTRIAL APPLICABILITY

The power transmission chain according to the present invention is capable of further suppressing polygonal vibration, thereby removing causes of noises. Thus, by applying this to a power transmission device of an automobile, for example, it is possible to enhance quietness of the automobile and to improve comfort.

The invention claimed is:

1. A power transmission chain provided over a first pulley having a sheave face with a conical surface shape and a second pulley having a sheave face with a conical surface shape, including:
   a plurality of links having front and back insertion parts through which pins are inserted; and
   a set of pins comprising a plurality of first pins and a plurality of second pins for connecting the links aligned in a chain width direction so as to be bendable in a longitudinal direction such that a front insertion part of one link and a back insertion part of another link correspond to each other, in which a first pin fixed to a front insertion part of one link and movably fitted in a back insertion part of another link and a second pin movably fitted in the front insertion part of the one link and fixed to the back insertion part of the other link move relatively in a rolling and contacting manner so as to enable bending in a longitudinal direction between the links,
   wherein, the pins move downward at, and before, a biting position where the pins move from a linear part to a circular part contacting the pulley, and at least two kinds of said sets of pins are provided, in which loci of rolling contact movement of the first pin and the second pin are different in each of the kinds of sets of pins, and wherein one or another of said at least two kinds of sets of pins are arranged randomly in said plurality of links,
   wherein a locus of a contact position of the first pin and the second pin is an involute of a circle, and a basic circle radius of an involute of the one of said two kinds of sets of pins is larger than a basic circle radius of an involute of the another of said two kinds of sets of pins,
   whereby resonance caused by polygonal vibrations due to repetition of up and down movement of the pins is reduced.

2. The power transmission chain as claimed in claim 1, wherein two or more kinds of links having different pitches are provided, and one or another of said two or more kinds of links are arranged randomly in the power transmission chain.

3. The power transmission chain as claimed in claim 1 or 2, wherein the basic circle radius is Rb obtained by $x = Rb \cdot (\sin\gamma - \gamma\cdot\cos\gamma)$, and $y = Rb \cdot (\cos\gamma + \gamma\cdot\sin\gamma) - Rb$, where a contact position of the first pin and the second pin in a chain linear part is an origin, a chain linear direction is an x axis, a direction orthogonal thereto is a y axis, and an angle defined by a pin tangential direction with respect to the y axis at a contact position of the first pin and the second pin in a chain curved part is $\gamma$.

4. The power transmission chain as claimed in claim 3, wherein the following relationships are established:

$$Rb = k \cdot R, \text{ and}$$

$$0.25 > k > 2r, \text{ where,}$$

when used as a chain for a CVT, a minimum radius of the chain curved part is R, and a transmission ratio of the CVT is r.

5. The power transmission chain as claimed in claim 2, wherein a basic circle radius of an involute of a link having a large pitch is larger than a basic circle radius of an involute of a link having a small pitch.

6. A power transmission device comprising:
   a first pulley having a sheave face in a conical surface shape;
   a second pulley having a sheave face in a conical surface shape; and
   a power transmission chain provided over the first pulley and the second pulley, wherein the power transmission chain is one according to any of claim 1 or 2.

7. The power transmission chain as claimed in claim 1, wherein [basic circle radius of involute]/[height of pin]=5 to 20.

* * * * *